(12) United States Patent
Miller et al.

(10) Patent No.: US 10,442,541 B2
(45) Date of Patent: Oct. 15, 2019

(54) METHOD AND SYSTEM FOR CROSS ENGINE DEBRIS AVOIDANCE

(71) Applicant: General Electric Company, Schenectady, NY (US)

(72) Inventors: Brandon Wayne Miller, Middletown, OH (US); Ian Francis Prentice, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/923,062

(22) Filed: Oct. 26, 2015

(65) Prior Publication Data

US 2017/0113805 A1 Apr. 27, 2017

(51) Int. Cl.
| | | |
|---|---|---|
| *B64D 27/02* | (2006.01) | |
| *B64C 11/48* | (2006.01) | |
| *B64D 27/12* | (2006.01) | |
| *B64D 27/00* | (2006.01) | |

(52) U.S. Cl.
CPC ............ *B64D 27/02* (2013.01); *B64C 11/48* (2013.01); *B64D 27/12* (2013.01); *B64D 2027/005* (2013.01); *Y02T 50/66* (2013.01)

(58) Field of Classification Search
CPC ..... B64C 11/46; B64C 15/12; B64C 29/0033; B64C 29/0075; B64D 27/02
USPC .............................................. 244/55, 56, 66
See application file for complete search history.

(56) References Cited

U.S. PATENT DOCUMENTS

| | | | |
|---|---|---|---|
| 1,996,750 A * | 4/1935 | De La Cierva | B64C 27/025 244/8 |
| 3,666,211 A | 5/1972 | Cathers et al. | |
| 4,976,396 A | 12/1990 | Carlson et al. | |
| 6,367,736 B1 * | 4/2002 | Pancotti | B64C 29/0033 244/48 |
| 7,900,868 B2 | 3/2011 | Sankrithi et al. | |
| 8,128,023 B2 | 3/2012 | Cazals | |
| 8,256,704 B2 * | 9/2012 | Lundgren | B64C 29/0033 244/7 C |
| 8,651,414 B2 | 2/2014 | Cazals et al. | |
| 8,800,912 B2 * | 8/2014 | Oliver | B64C 29/0033 244/12.4 |

(Continued)

FOREIGN PATENT DOCUMENTS

| | | |
|---|---|---|
| EP | 2 738 092 A2 | 6/2014 |
| FR | 2 965 250 A1 | 3/2012 |

OTHER PUBLICATIONS

Extended European Search Report and Opinion issued in connection with corresponding EP Application No. 16194096.0 dated Apr. 10, 2017.

*Primary Examiner* — Richard R. Green
*Assistant Examiner* — Brady W Frazier
(74) *Attorney, Agent, or Firm* — General Electric; James Reed

(57) ABSTRACT

A propulsion system for an aircraft includes at least two propulsion engines. Each propulsion engine rotates about a longitudinal rotational axis, and a propulsive fan associated with each propulsion engine rotates in a plane perpendicular to the longitudinal rotational axis. Each plane is at least one of spaced axially along a fuselage of the aircraft and canted such that each plane does not intersect any other plane associated with another propulsion engine and propulsive fan.

17 Claims, 9 Drawing Sheets

(56) References Cited

U.S. PATENT DOCUMENTS

| | | | |
|---|---|---|---|
| 2003/0094537 A1* | 5/2003 | Austen-Brown | B64C 27/28 244/7 R |
| 2003/0168552 A1* | 9/2003 | Brown | B64C 11/46 244/55 |
| 2010/0019081 A1* | 1/2010 | Cazals | B64C 15/12 244/56 |
| 2010/0047068 A1* | 2/2010 | Parry | B64C 11/48 416/1 |
| 2012/0119023 A1* | 5/2012 | Moore | B64D 27/14 244/1 N |
| 2012/0325958 A1 | 12/2012 | Cazals et al. | |
| 2014/0252159 A1 | 9/2014 | Stretton | |
| 2014/0271179 A1 | 9/2014 | Koch, IV | |
| 2014/0367509 A1* | 12/2014 | Smith | B64C 29/0033 244/12.4 |

\* cited by examiner

METHOD AND SYSTEM FOR CROSS ENGINE DEBRIS AVOIDANCE

BACKGROUND

The field of the disclosure relates generally to gas turbine engines and, more particularly, to a method and system for avoiding cross engine debris in open rotor engine installations At least some known aircraft include open rotor configurations for their engines. For example, open rotor propulsion systems may include turboprops and counter rotating open rotors. Release of a fan blade from one engine may have a potential to cause debris from the affected engine to impact portions of another of the aircraft's engines. Such an impact may negatively affect the other engines such that they may fail as well. Installing a cowling or other shielding device to limit the effect of a blade release adds weight and drag to the aircraft which would also negatively impact fuel efficiency of the aircraft.

BRIEF DESCRIPTION

In one aspect, propulsion system for an aircraft is provided. The propulsion system includes at least two propulsion engines. Each propulsion engine rotates about a longitudinal rotational axis, and a propulsive fan associated with each propulsion engine rotates in a plane perpendicular to the longitudinal rotational axis. Each plane is at least one of spaced axially along a fuselage of the aircraft and canted such that each plane does not intersect any other propulsion engine and propulsive fan.

In another aspect, a method for mounting a propulsion system that includes at least two propulsion engines on an aircraft is provided. Each propulsion engine rotates about a longitudinal rotational axis, and a propulsive fan associated with each propulsion engine rotates in a plane perpendicular to the longitudinal rotational axis. The method includes at least one of spacing each plane associated with each propulsion engine axially along a longitudinal axis of the aircraft, and canting at least one plane associated with at least one propulsion engine. Each plane associated with each propulsion engine does not intersect any other propulsion engine and propulsive fan.

DRAWINGS

These and other features, aspects, and advantages of the present disclosure will become better understood when the following detailed description is read with reference to the accompanying drawings in which like characters represent like parts throughout the drawings, wherein.

Figure 1:
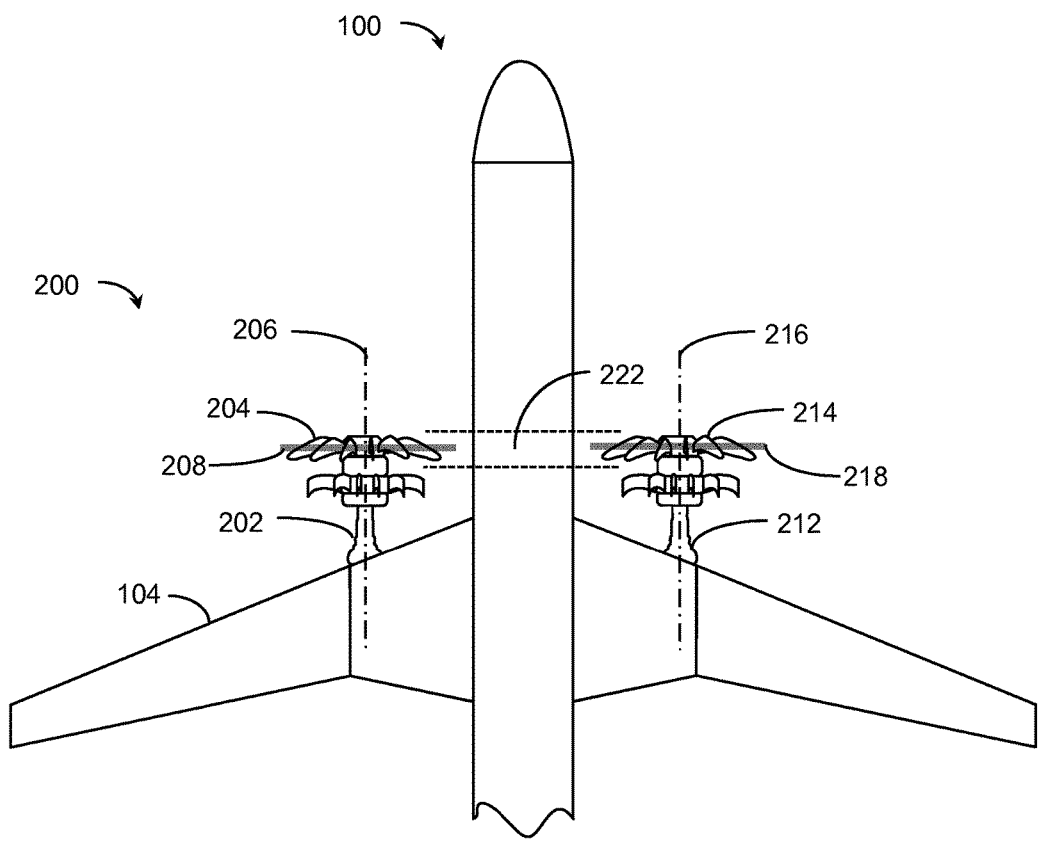
FIG. 1 is a top view of an aircraft with twin propulsion engines mounted symmetrically on each wing of the aircraft.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The aircraft engine systems described herein provide cost-effective methods for providing a multi-engine propulsion system with enhanced operational safety and reliability. In particular, the propulsion systems described herein include at least two propulsion engines mounted so that each propulsion engine is axially spaced and/or splayed relative to each other propulsion engine of the propulsion system. In this arrangement, a plane of rotation of each fan rotor for each engine does not intersect any other propulsion engine of the propulsion system. In the case of a rotor release by any one of the propulsion engines of the propulsion system, any resulting cross-engine debris is directed away from any of the other propulsion engines, thereby reducing the risk of impact and associated damage due to cross-engine debris strikes. In various embodiments described herein, any combination of axial spacing and splaying may be used to situate each plane of rotation of each fan rotor in non-alignment with all other planes of rotation of all other fan rotors for all propulsion engines of the multi-engine propulsion system.

The multi-engine propulsion system that includes staggered and/or splayed propulsion engines offers advantages over known methods of providing protection against cross-engine debris strikes, such as the incorporation of fuselage armoring or other protective structures into the design of the aircraft propulsion system. These known methods add weight to the aircraft, thereby increasing the aircraft's fuel use. In addition, the incorporation of armoring increases the complexity of the aircraft design, and potentially introduces handedness constraints to the design and installation of the at least two propulsion engines of the propulsion system. The multi-engine propulsion system described herein enables the incorporation of highly efficient open-rotor propulsion engine designs without compromising the safety or reliability of the propulsion system.

FIG. 1 shows a top view of a typical existing propulsion system 200 for aircraft 100 that includes at least two propulsion engines 202, 212 mounted on wings 104 of aircraft 100. First propulsion engine 202 includes at least one first propulsive fan 204 that rotates within first fan plane 208 perpendicular to first engine longitudinal rotational axis 206. Similarly, second propulsion engine 212 includes at least one second propulsive fan 214 that rotates within second fan plane 218 perpendicular to second engine longitudinal rotational axis 216. In existing propulsion system 200 illustrated in FIG. 1, first fan plane 208 and second fan plane 218 are aligned with one another. Consequently, in the event of a rotor release of either first propulsive fan 204 or second propulsive fan 214, potential cross-engine debris path 222 of any resulting cross-engine debris is directed between first propulsive fan 204 and second propulsive fan 214.

Figure 2:
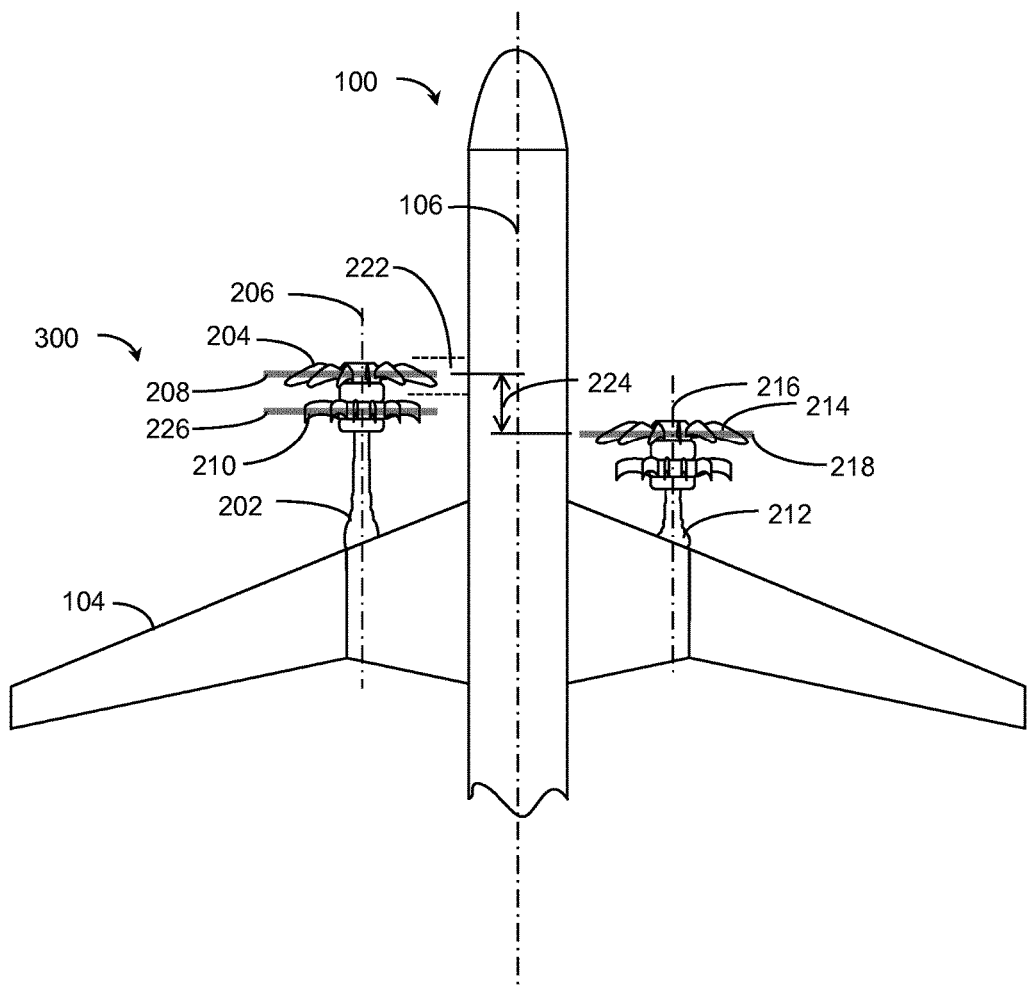
FIG. 2 is a top view of an aircraft with a first propulsion engine mounted axially forward of a second propulsion engine.

In some embodiments, first propulsion engine 202 and/or second propulsion engine 212 are shifted in an axial direction, defined herein as a direction parallel to longitudinal axis 106 extending along fuselage 102 of aircraft 100. FIG. 2 shows a top view of exemplary propulsion system 300 for aircraft 100 in one embodiment. First propulsion engine 202 is axially spaced relative to second propulsion engine 212 in a direction parallel to aircraft longitudinal axis 106. Consequently, potential cross-engine debris path 222 in the event of a rotor release of first propulsive fan 204 does not impact second fan plane 218. In some embodiments, first propulsion engine 202 may further include first aft propulsive fan 210 and associated first aft fan plane 226. Axial spacing 224 further staggers first aft fan plane 226 ahead of second fan plane 218, thereby reducing the risk of cross-engine debris impact on second propulsion engine 212 in the event of a rotor failure of first aft propulsive fan 210.

Figure 3:
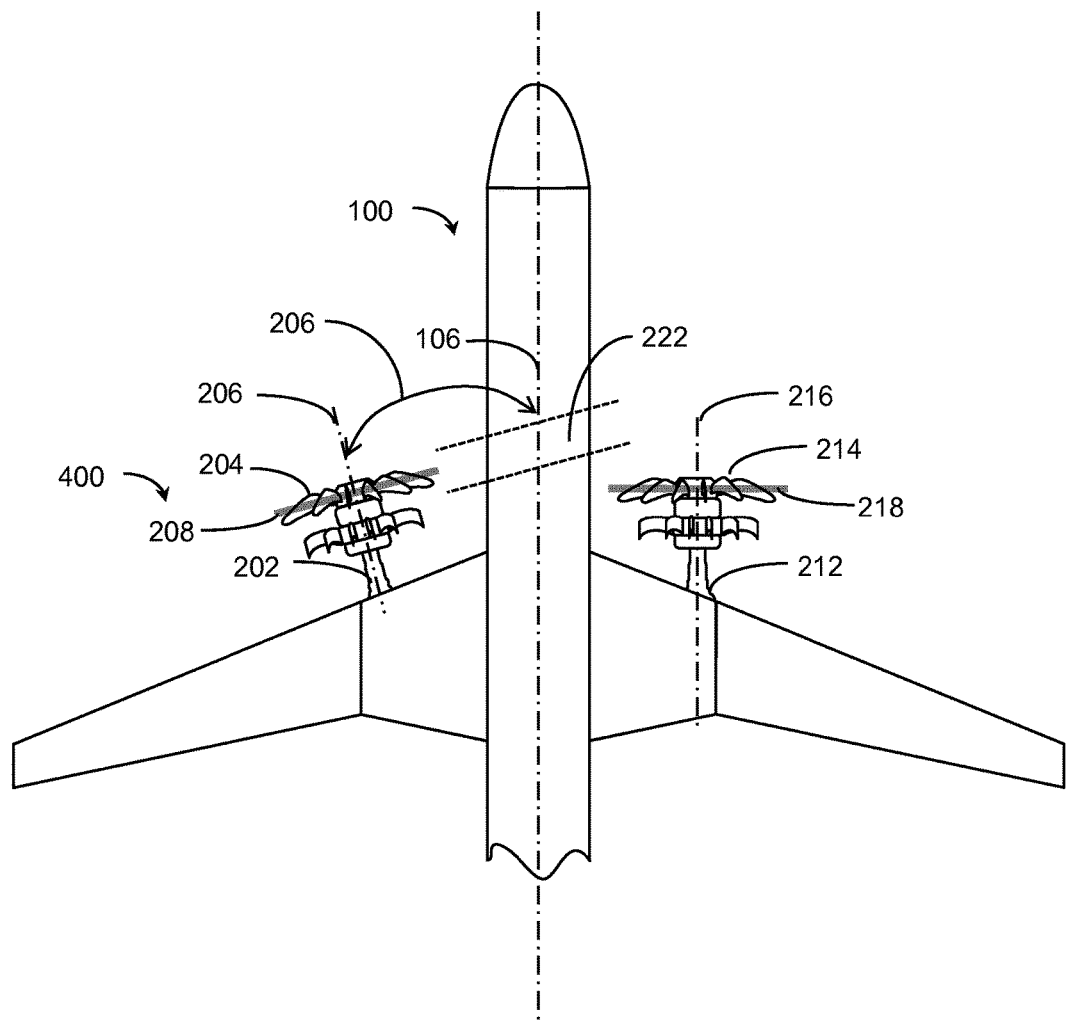
FIG. 3 is a top view of an aircraft with a first propulsion engine canted away from a second propulsion engine.

FIG. 3 shows a top view of another exemplary propulsion system 400 for aircraft 100 in one embodiment. First propulsion engine 202 is splayed away from second propulsion engine 212, thereby rotating first fan plane 208 relative to second fan plane 218. Consequently, potential cross-engine debris path 222 in the event of a rotor release of first propulsive fan 204 does not impact second fan plane 218.

Figure 4:
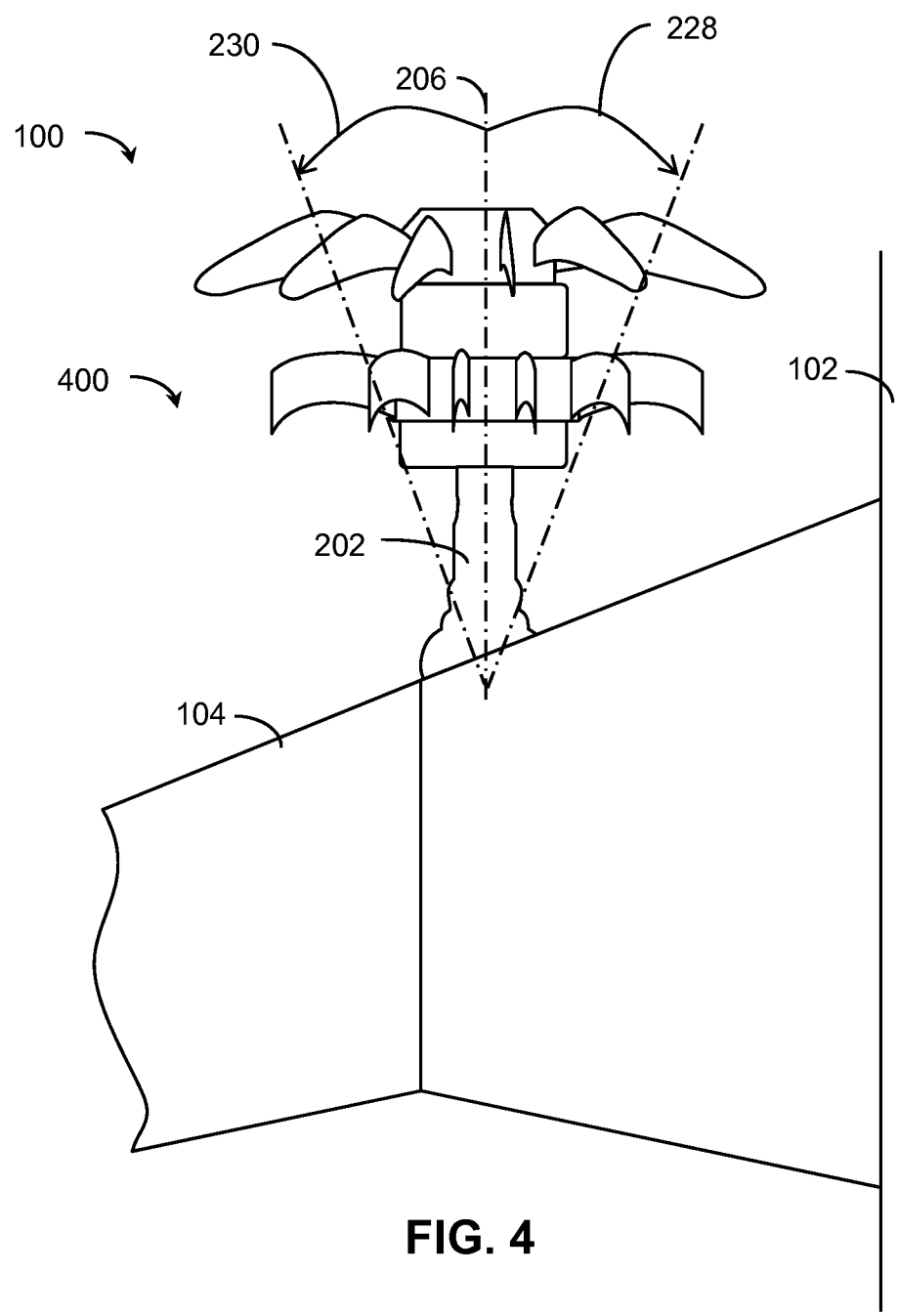
FIG. 4 is a top close-up view of an aircraft showing a range of toe angles at which a propulsion engine is canted.

FIG. 4 shows a close-up top view of first propulsion engine 202. In various embodiments, first engine longitudinal rotational axis 206 and/or second propulsion engine 212 is splayed at either inboard toe angle 228 or at outboard toe angle 230. As used herein, inboard toe angle 228 is defined as a rotation of first engine longitudinal rotational axis 206 toward fuselage 102 of aircraft 100 and by extension toward second propulsion engine 212 mounted on opposite wing 104 (not illustrated). As used herein, outboard toe angle 230 is defined as a rotation of first engine longitudinal rotational axis 206 away from fuselage 102 of aircraft 100 and by extension away from second propulsion engine 212 mounted on opposite wing 104 (not illustrated).

In various embodiments, only one of first propulsion engine 202 and second propulsion engine 212 is splayed, as illustrated in FIG. 3. In various other embodiments, both of first propulsion engine 202 and second propulsion engine 212 are splayed. Toe angles 228, 230 at which first propulsion engine 202 and second propulsion engine 212 are splayed are independently selected. In one embodiment, inboard toe angle 228 ranges from about 0° (parallel to aircraft longitudinal axis 106) to about 20° and outboard toe angle 230 ranges from about 0° (parallel to aircraft longitudinal axis 106) to about 20°.

Figure 5:
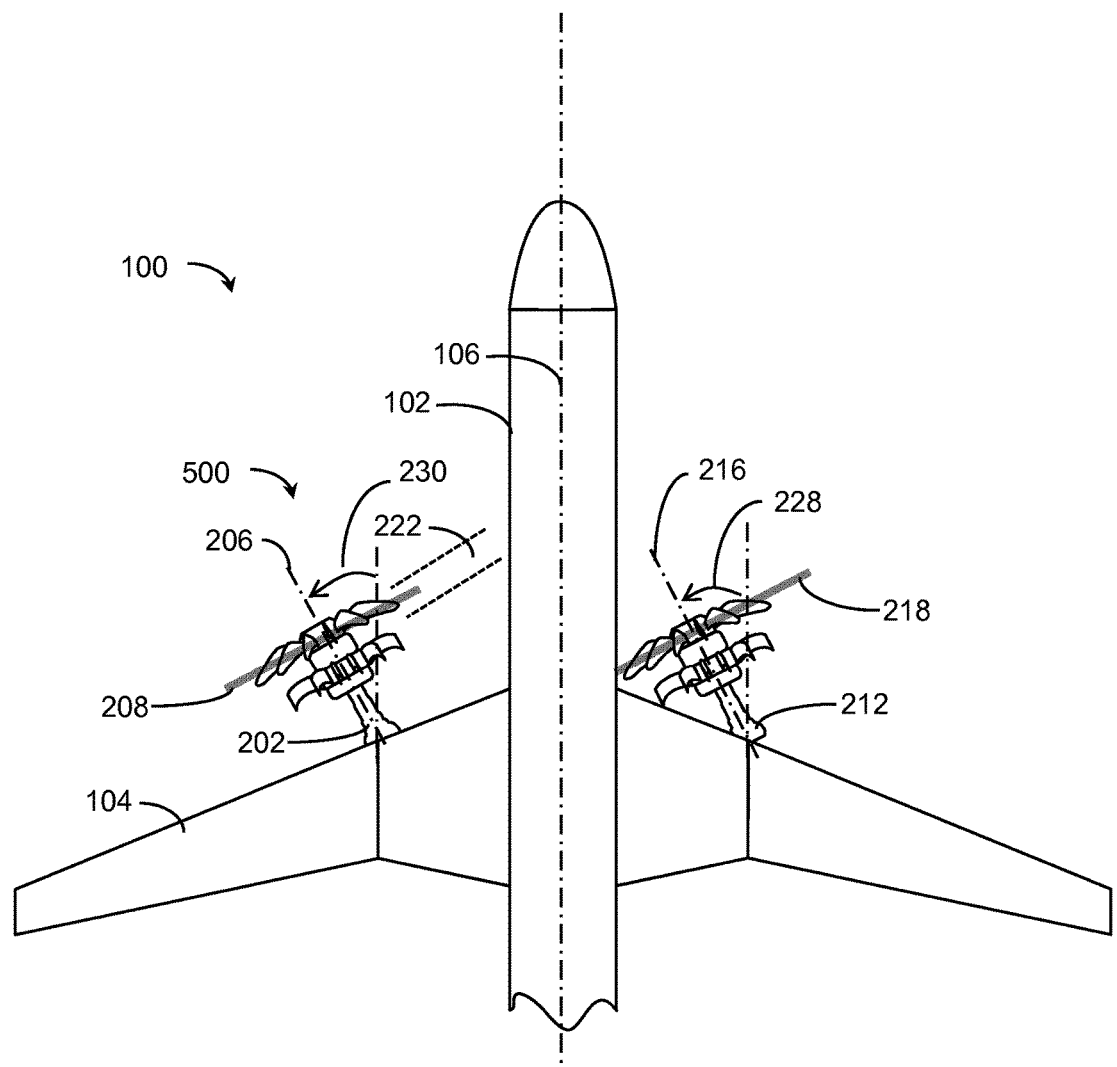
FIG. 5 is a top view of an aircraft with both propulsion engines canted in the same direction.

FIG. 5 shows a top view of another exemplary propulsion system 500 for aircraft 100 in one embodiment. First propulsion engine 202 and second propulsion engine 212 are splayed in the same direction, thereby rotating first fan plane 208 and second fan plane 218 relative to one another. Consequently, potential cross-engine debris path 222 in the event of a rotor release of first propulsive fan 204 does not impact second fan plane 218 or vice-versa. In order to be splayed in the same direction, first propulsion engine 202 is splayed at outboard toe angle 230 and second propulsion engine 212 is splayed at inboard toe angle 228, as illustrated in FIG. 5, or vice-versa (not illustrated).

Figure 6:
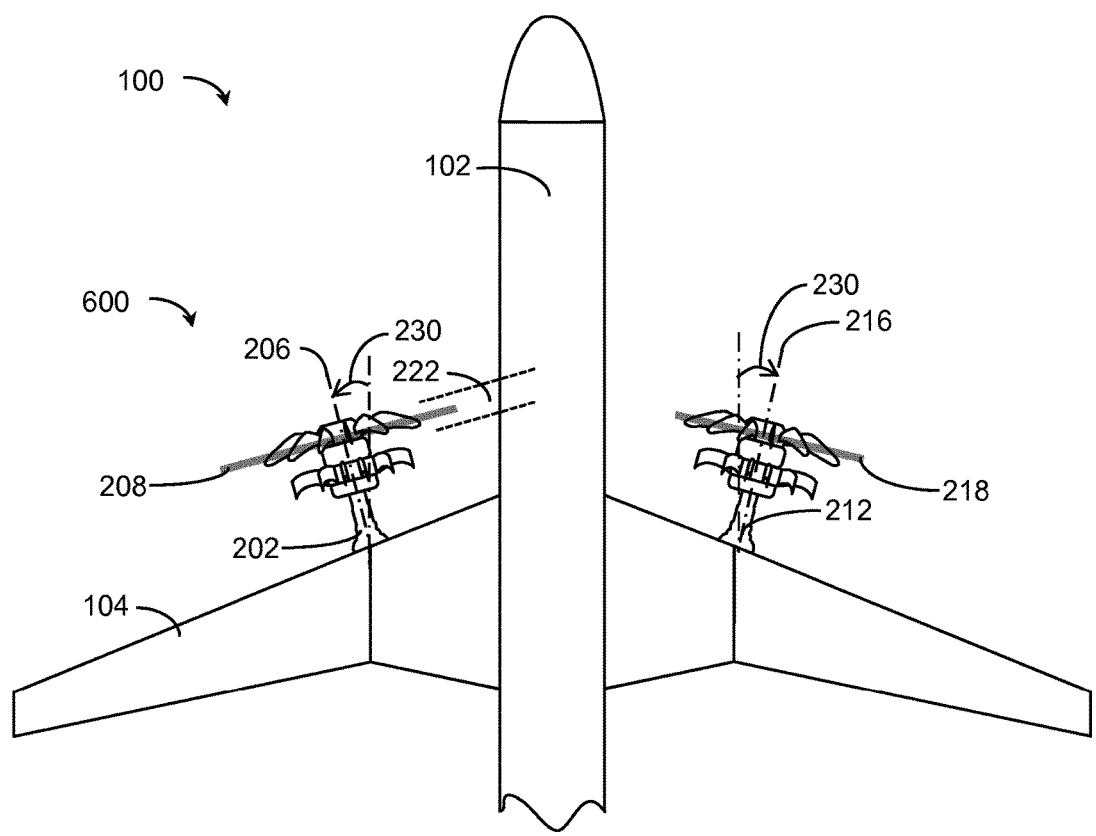
FIG. 6 is a top view of an aircraft with both propulsion engines canted outboard.
Figure 7:
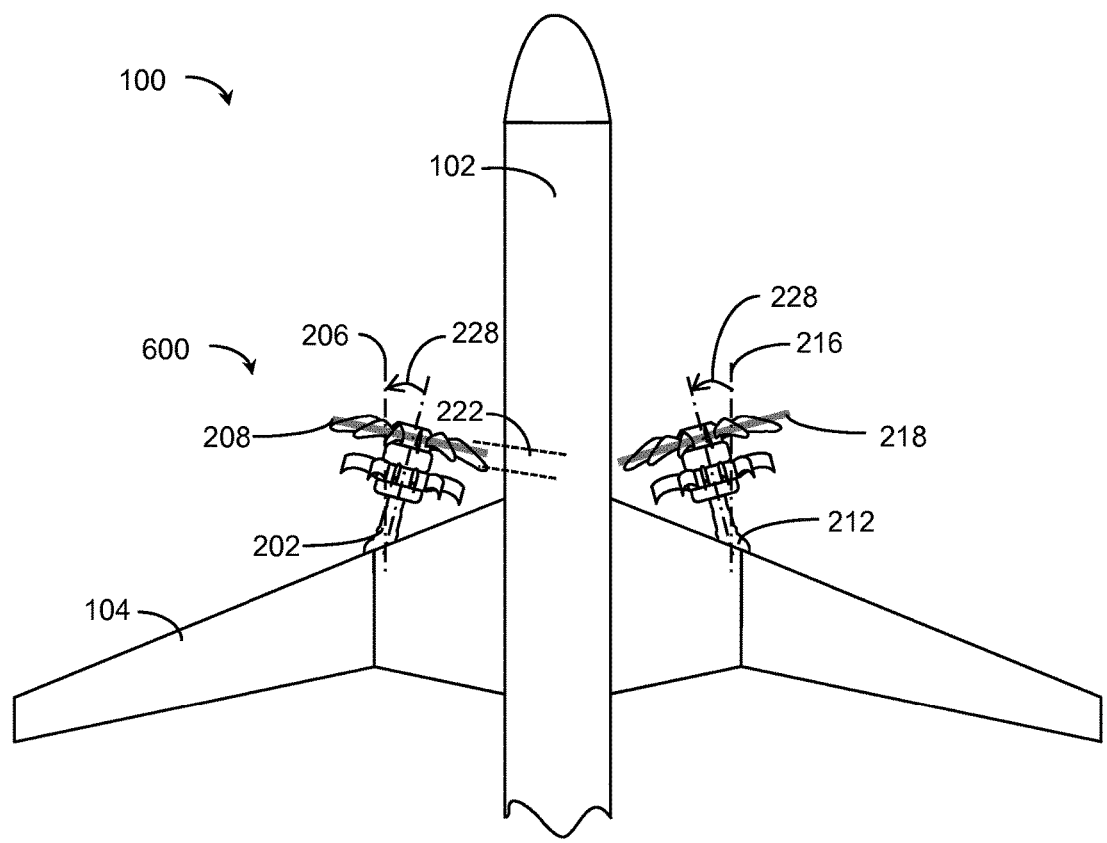
FIG. 7 is a top view of an aircraft with both propulsion engines canted inboard.

FIG. 6 shows a top view of another exemplary propulsion system 600 for aircraft 100 in one embodiment. First propulsion engine 202 and second propulsion engine 212 are splayed in opposite directions, thereby rotating first fan plane 208 and second fan plane 218 relative to one another. Consequently, potential cross-engine debris path 222 in the event of a rotor release of first propulsive fan 204 does not impact second fan plane 218 or vice-versa. In order to be splayed in opposite directions, both first propulsion engine 202 and second propulsion engine 212 are splayed at outboard toe angle 230, as illustrated in FIG. 6, or both first propulsion engine 202 and second propulsion engine 212 are splayed at inboard toe angle 228, as illustrated in FIG. 7.

Figure 8:
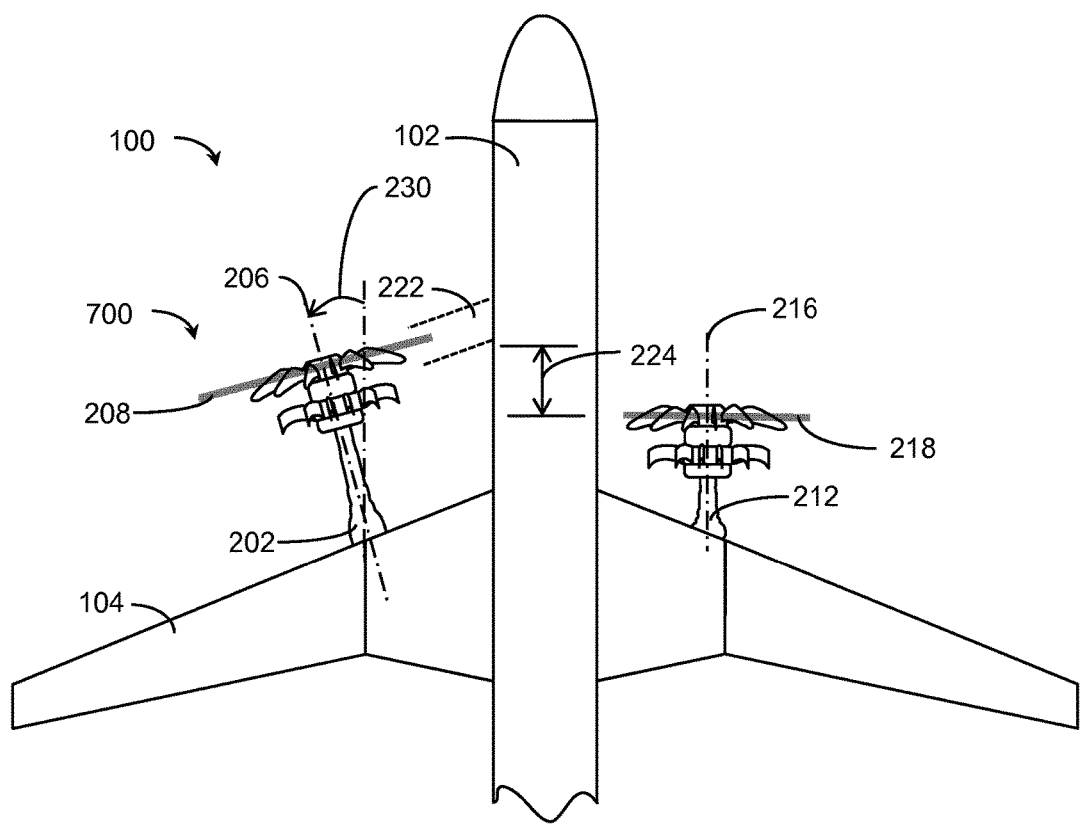
FIG. 8 is a top view of an aircraft with a first propulsion engine mounted axially forward of a second propulsion engine and canted away from the second propulsion engine.
Figure 9:
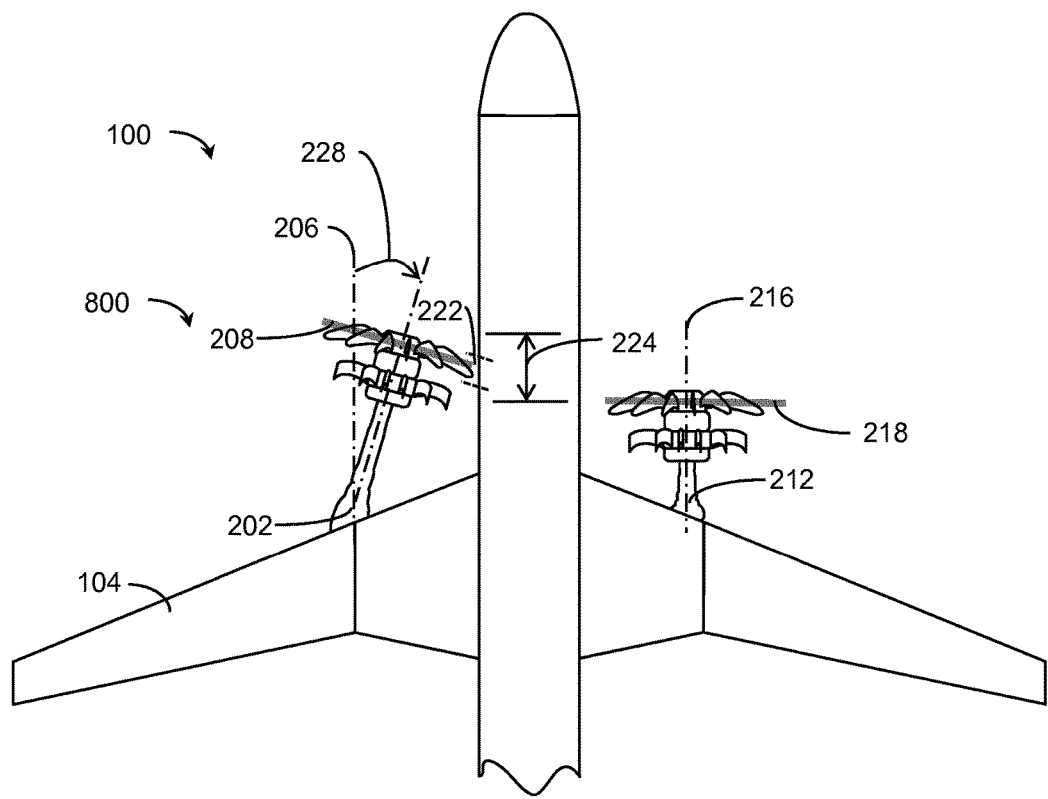
FIG. 9 is a top view of an aircraft with a first propulsion engine mounted axially forward of a second propulsion engine and canted toward the second propulsion engine.

In various embodiments, first propulsion engine 202 is axially spaced at axial spacing 224 relative to second propulsion engine 212 and first propulsion engine 202 is additionally splayed at outboard toe angle 230. FIG. 8 shows a top view of another exemplary propulsion system 700 for aircraft 100 in one embodiment. First propulsion engine 202 is axially displaced by axial spacing 224 relative to second propulsion engine 212 and first propulsion engine 202 is splayed at outboard toe angle 230 away from second propulsion engine 212. Consequently, potential cross-engine debris path 222 in the event of a rotor release of first propulsive fan 204 does not impact second fan plane 218 and vice-versa. FIG. 9 shows a top view of another exemplary propulsion system 200 for aircraft 100 in one embodiment. First propulsion engine 202 is axially displaced by axial spacing 224 relative to second propulsion engine 212 and first propulsion engine 202 is splayed at inboard toe angle 228 toward second propulsion engine 212. Consequently, potential cross-engine debris path 222 in the event of a rotor release of first propulsive fan 204 does not impact second fan plane 218 and vice-versa.

In various embodiments, a method for mounting a multi-engine propulsion system that includes at least two propulsion engines on an aircraft is disclosed herein. The method includes any one of axially displacing first propulsion engine 202 relative to second propulsion engine 212 and splaying first propulsion engine 202 and/or second propulsion engine 212 at inboard toe angle 228 or at outboard toe angle 230 as described herein previously. The method includes any combination of axial spacing 224 and splaying of the first propulsion engine 202 and/or the second propulsion engine 212 in any combination without limitation. Exemplary embodiments of propulsion systems 200, 300, 400, 500, 600, 700, 800 mounted on aircraft 100 using the method are described herein above and illustrated as FIGS. 1-9.

In various embodiments, the at least two propulsion engines of the propulsion system include, but are not limited to, prop-fan engines. A non-limiting example of a suitable prop-fan engine includes a dual propeller, contra-rotating prop-fan engine that includes a front propeller and an aft propeller.

Exemplary embodiments of propulsion systems that include at least two propulsion engines are described above in detail. The propulsion systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring non-alignment of the fan planes associated with the at least two propulsion engines of the other systems, and are not limited to practice with only the systems and methods as described herein. Rather, the exemplary embodiments can be implemented and utilized in connection with many other aircraft propulsion system applications that are currently configured to receive and accept at least two propulsion engines.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fixed-wing aircraft comprising:
   a fuselage, a first wing extending outwardly from a first side of the fuselage, and a second wing extending outwardly from a second, opposite side of the fuselage;
   first and second propulsion engines, the first propulsion engine being connected to the first wing and the second propulsion engine being connected to the second wing, each of the first and second propulsion engines rotating about a respective longitudinal rotational axis;
   a propulsive fan associated with each of the first and second propulsion engines rotating in a plane perpendicular to the respective longitudinal rotational axis, each plane positioned at least one of spaced axially along a longitudinal axis of the aircraft and canted such that each plane does not intersect any other propulsion engine or propulsive fan, wherein said first propulsion engine is axially spaced from said second propulsion engine and canted away from said second propulsion engine.

2. The aircraft of claim 1, wherein said second propulsion engine is canted.

3. The aircraft of claim 2, wherein said first propulsion engine and said second propulsion engine are canted in the same direction.

4. The aircraft of claim 2, wherein said first propulsion engine and said second propulsion engine are canted in different directions.

5. A fixed-wing aircraft comprising:
   a fuselage, a first wing extending outwardly from a first side of the fuselage, and a second wing extending outwardly from a second, opposite side of the fuselage;
   first and second propulsion engines, the first propulsion engine being connected to the first wing and the second propulsion engine being connected to the second wing, each of the first and second propulsion engines rotating about a respective longitudinal rotational axis;
   a propulsive fan associated with each of the first and second propulsion engines rotating in a plane perpendicular to the respective longitudinal rotational axis, each plane positioned at least one of spaced axially along a longitudinal axis of the aircraft and canted such that each plane does not intersect any other, propulsion engine or propulsive fan, wherein said first propulsion engine is axially spaced from said second propulsion engine and canted towards said second propulsion engine.

6. The aircraft of claim 1, wherein said first and second propulsion engines are prop-fan engines, each prop-fan engine being dual propeller, contra-rotating, including a front propeller and an aft propeller.

7. The aircraft of claim 1, wherein at least one of said first and second propulsion engines is canted at a toe angle ranging from about 20 degrees inboard to about 20 degrees outboard.

8. The aircraft of claim 1, wherein each of said first and second propulsion engines is operated at different thrust levels to compensate for asymmetric torques resulting from at least one of said axial spacing and canting of each of said first and second propulsion engines.

9. A method for mounting a propulsion system comprising first and second propulsion engines on a fixed-wing aircraft having a fuselage and a first wing extending outwardly from a first side of the fuselage and a second wing extending outwardly from a second, opposite side of the fuselage, wherein each first and second propulsion engines rotates about a longitudinal rotational axis, the first propulsion engine being axially spaced from the second propulsive engine, a propulsive fan associated with each of the first and second propulsion engines rotate in a plane perpendicular to the longitudinal rotational axis, the plane defines a debris path, and an aft propeller is associated with each of said first and second propulsion engines, the method comprising:
   spacing each plane associated with each of the first and second propulsion engines axially along a longitudinal axis of the aircraft; and
   canting at least one plane associated with at least one of the first and second propulsion engines, such that the first propulsion engine is canted away from the second propulsion engine;
   wherein each plane and resulting debris path do not intersect any other propulsion engine or propulsive fan; and
   wherein said aft propeller is axially aft of said propulsive fan.

10. The method of claim 9, wherein said aft propeller associated with each of said first and second propulsion engines rotates.

11. The method of claim 10, wherein the first propulsion engine and the second propulsion engine are canted.

12. The method of claim 11, wherein the first propulsion engine and the second propulsion engine are canted in the same direction, and wherein the first and second propulsion engines are prop-fan engines, each prop-fan engine being dual propeller, contra-rotating, including a front propeller and an aft propeller.

13. The method of claim 11, wherein the first propulsion engine and the second propulsion engine are canted in different directions.

14. A method for mounting a propulsion system comprising first and second propulsion engines on a fixed-wing aircraft having a fuselage and a first wing extending outwardly from a first side of the fuselage and a second wing extending outwardly from a second, opposite side of the fuselage, wherein each first and second propulsion engines rotates about a longitudinal rotational axis, the first propulsion engine being axially spaced from the second propulsive engine, a propulsive fan associated with each of the first and second propulsion engines rotate in a plane perpendicular to the longitudinal rotational axis, the plane defines a debris path, and an aft propeller is associated with each of said first and second propulsion engines, the method comprising;

spacing each plane associated with each of the first and second propulsion engines axially along a longitudinal axis of the aircraft; and canting at least one plane associated with at least one of the first and second propulsion engines, such that the first propulsion engine is canted towards the second propulsion engine;

wherein each plane and resulting debris path do not intersect any other propulsion engine or propulsive fan; and wherein said aft propeller is axially aft of said propulsive fan.

15. The method of claim 9, wherein the first and second propulsion engines are prop-fan engines, each prop-fan engine being dual propeller, contra-rotating, including a front propeller and an aft propeller.

16. The method of claim 9 wherein at least one of the first and second propulsion engines is canted at a toe angle ranging from about 1 degree outboard to about 20 degrees outboard.

17. The method of claim 9, wherein each of the first and second propulsion engines of the propulsion system is operated at different thrust levels to compensate for asymmetric torques resulting from at least one of the axial spacing and canting of each of the first and second propulsion engines.

* * * * *